Patented Feb. 17, 1942

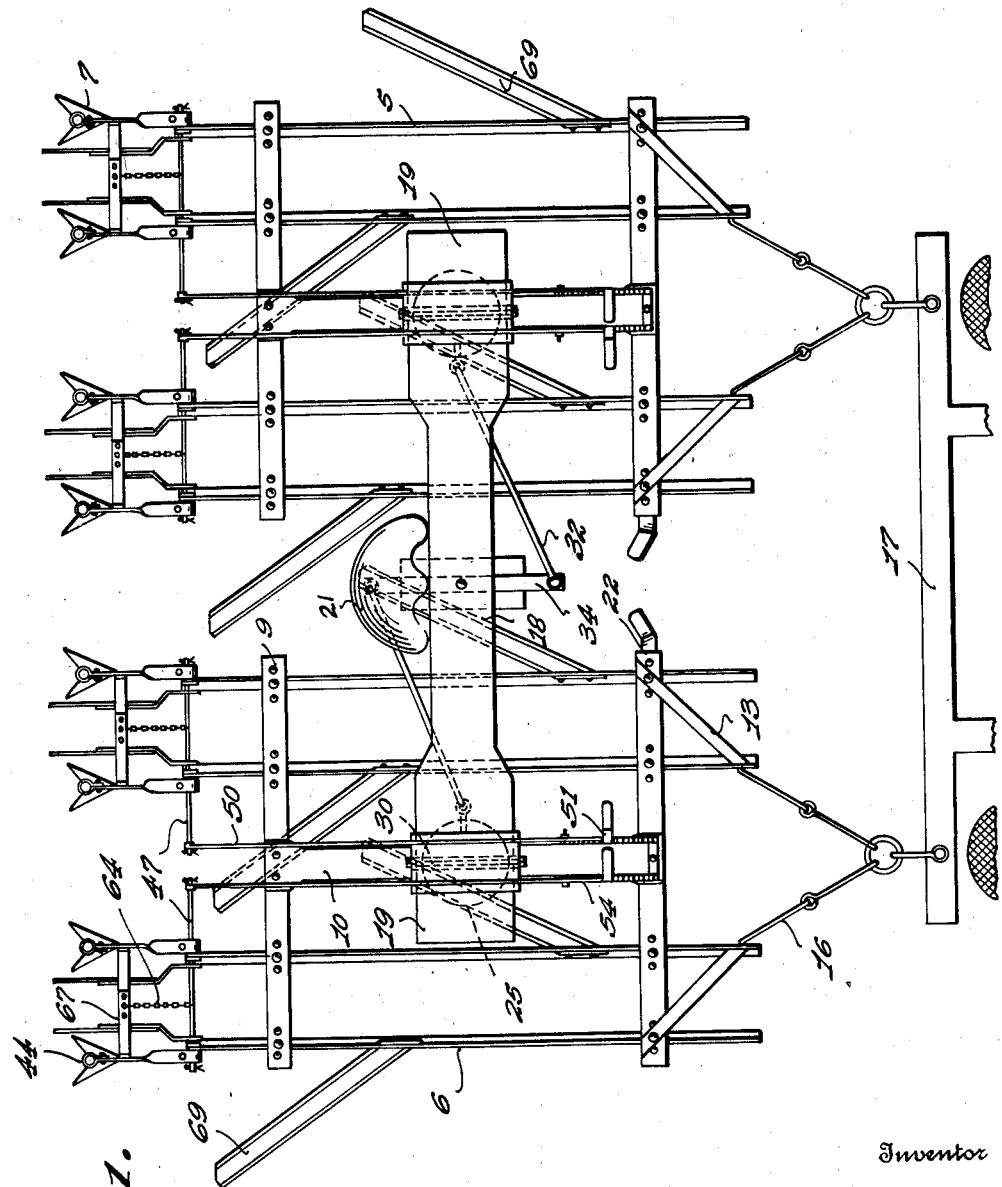

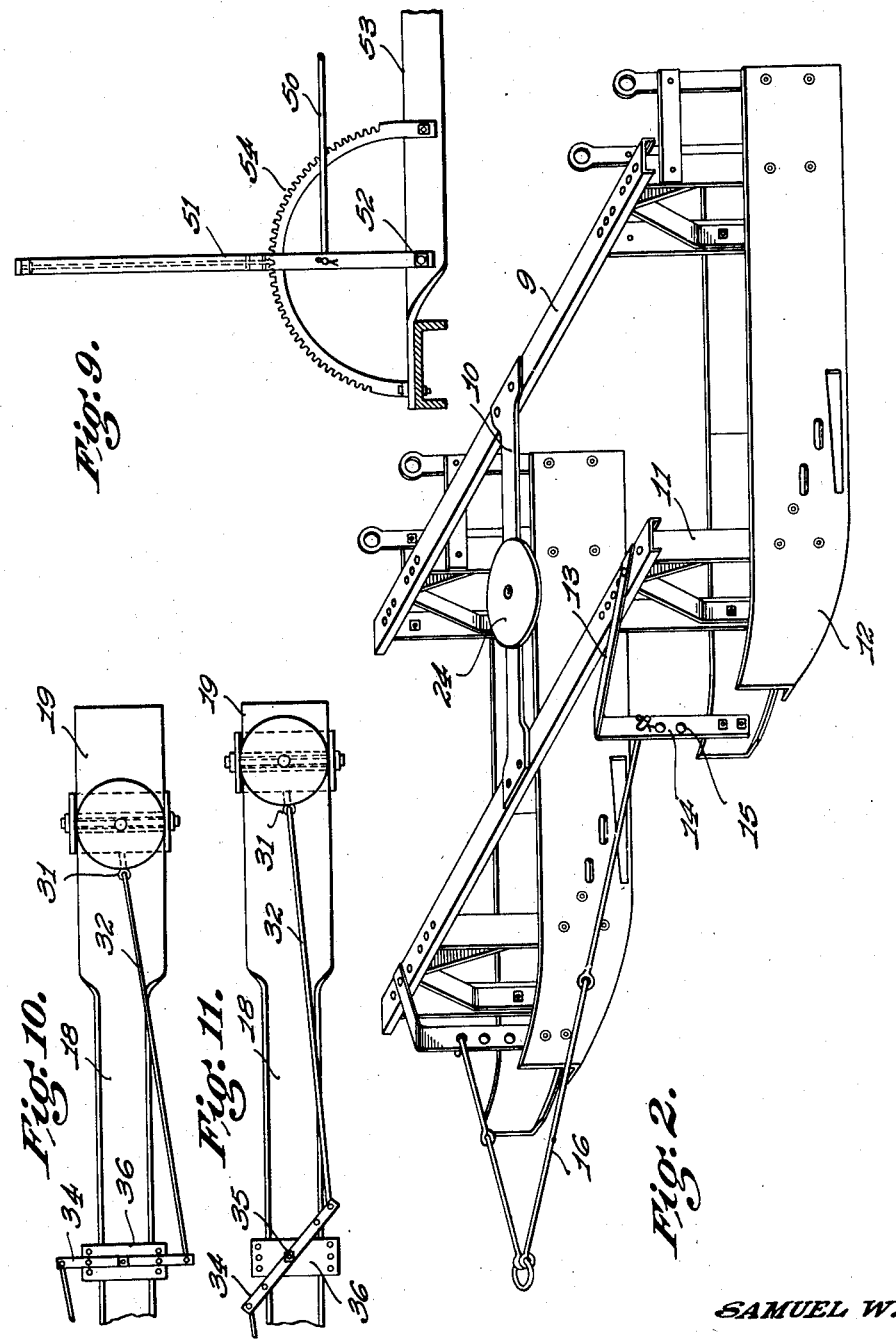

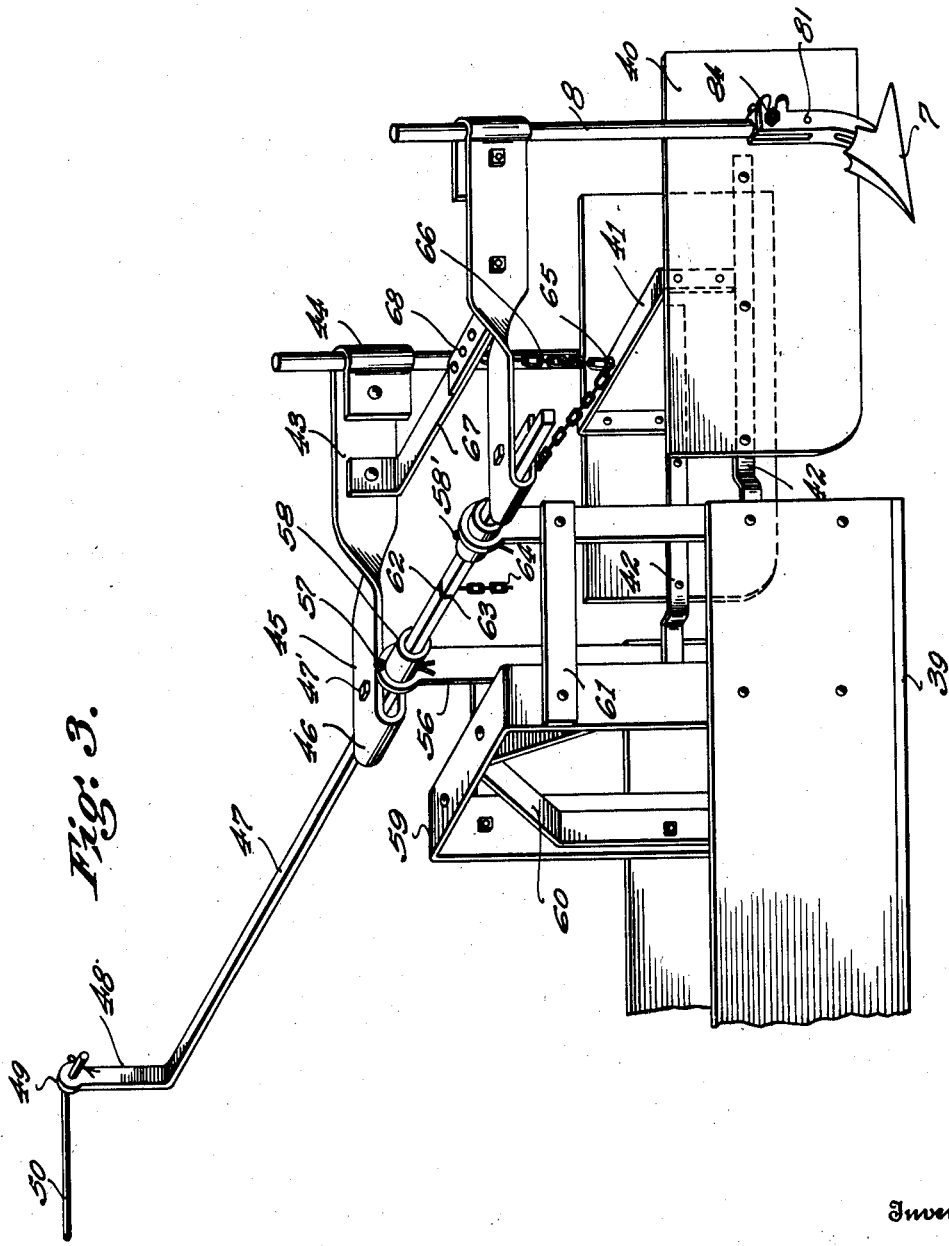

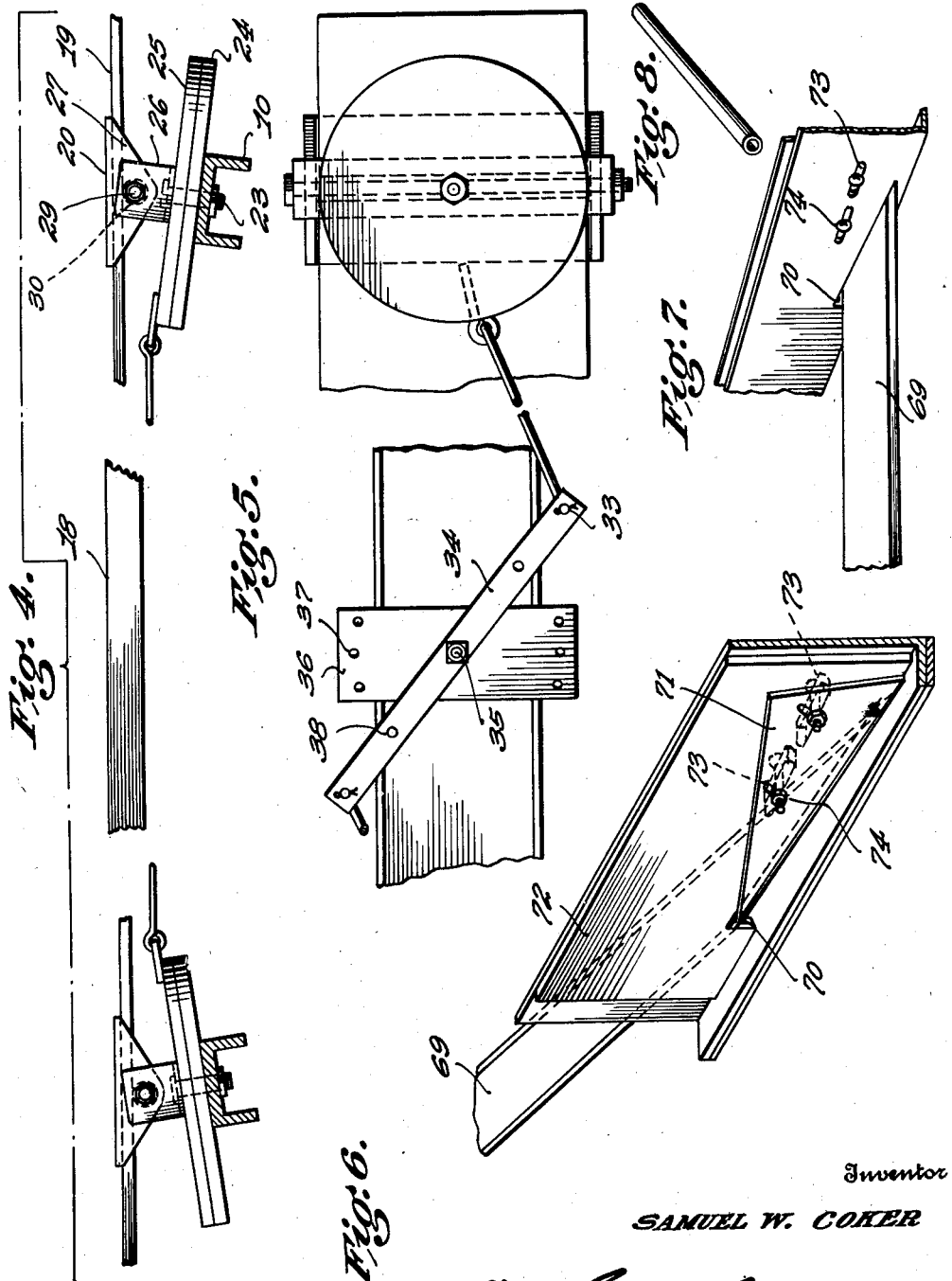

2,273,392

UNITED STATES PATENT OFFICE 2,273,392

MULTIPLE GANG CULTIVATOR

Samuel W. Coker, Colorado, Tex., assignor of one-half to Robert F. Singleton, Dallas, Tex.

Application September 21, 1939, Serial No. 295,971

8 Claims. (Cl. 97—143)

This invention relates to agricultural machines and more particularly to a machine of the multiple gang cultivator type.

The object of the invention is to provide an agricultural implement of simple and durable construction in which coacting cultivator sections are mounted side by side in spaced relation to each other so as to permit the cultivation of a plurality of rows of plants at one operation of the machine.

A further object of the invention is to provide means for adjusting one cultivator section with respect to the other and means for locking said sections in adjusted positions so that there will be no variation in the distance between the sections.

A further object is to connect the cultivator sections in such a manner as to permit either section to conform to a hillside or other inclined surface without affecting the other cultivator section.

A further object is to provide the cultivator sections with coacting disks which act as fifth wheels to facilitate turning of the machine when it reaches the end of a row.

A further object is to provide an agricultural machine in which the cultivator sections are connected by a seat-carrying bar having a sliding connection with the coacting disks, and shifting mechanism mounted on said seat-carrying bar and operatively connected with said disks for adjusting the cultivator sections laterally with respect to each other.

A further object is to provide novel means for raising and lowering the cultivator shoes and fenders coacting with said shoes to confine the soil around the growing plants.

A further object is to provide the cultivator sections with lateral cutters or knives for removing weeds and other growing vegetation in the path of the machine.

Further objects and advantages will appear in the following specification.

In the accompanying drawings forming a part of this specification and in which similar numerals of reference indicate corresponding parts in all the figures of the drawings:

Figure 1 is a top plan view of a multiple gang cultivator embodying the present invention, Figure 2 is a detail perspective view of the forward end of the cultivator, Figure 3 is a similar view of a portion of the rear end of the cultivator, Figure 4 is a side elevation, partly in section, of the connecting means between the cultivator sections, Figure 5 is a bottom plan view showing the manner of spreading or separating the cultivator sections, Figure 6 is a detail perspective view looking at the inside of the runner and showing how the cutting blades or knives are secured thereto, Figure 7 is a similar view looking at the outside of the runner, Figure 8 is a detached perspective view of the roller that engages the seat bar, Figure 9 is a side elevation, partly in section, of the lever for raising and lowering the cultivator plows or shoes, Figure 10 is a bottom plan view of the shifting mechanism on a reduced scale showing the position of the parts before the shift lever is operated, and Figure 11 is a similar view showing the position of the parts when the shift lever is operated to separate the cultivator sections.

The improved agricultural machine forming the subject-matter of the present invention is preferably formed in two sections 5 and 6 each provided at its rear end with plows 7 mounted on vertical rods or standards 8 so that a plurality of rows of plants may be cultivated at one operation of the machine. The plows 7 may be of any standard construction, but it is preferred to pivotally mount the plow foot on the standard 8, as indicated at 8l, and to form the upper end of the foot with a slotted portion adapted to receive a bolt 8A so as to permit the plow and foot to swing rearwardly in the event a rock or stump is encountered and thus prevent breakage of the plow. Each cultivator section comprises a supporting frame including spaced transverse bars 9 rigidly connected by a central longitudinal bar 10, and riveted or otherwise rigidly secured to the transverse bars 9 are depending yokes 11 to which are secured spaced runners 12. Converging braces 13 are disposed at the front of the machine and one end of each brace is secured to the forward transverse bar 9 while the other end of the brace is secured to the adjacent runner 12. The uprights 14 of the braces 12 are provided with a vertical series of openings 15 adapted to adjustably receive a link draft device 16 for attachment to the draw-bar 17 of a tractor or to a draft animal. Extending transversely of the machine is a seat bar 18 and the opposite ends of this seat bar are enlarged laterally and made relatively thin, as indicated at 19, for cooperation with saddle members 20 carried by the respective cultivator sections.

Disposed between the cultivator sections 5 and 6 and secured to the bar 18 in any suitable manner is a seat 21 for the operator, and extending inwardly from each section in advance of the seat are supports 22 on which the operator rests his feet when the machine is in use.

Mounted on the longitudinal bar 10 of each cultivator section and secured thereto by a bolt or similar fastening device 23 is a flat relatively movable disk 24, and coacting with said disk is a relatively stationary companion disk 25 through which the bolt 23 also passes. Secured to the upper disk 25 is an upstanding substantially U-shaped frame 26, between which the adjacent saddle member 20 is pivotally mounted for tilting movement. Extending through the frame 26 and depending flanges 27 of the saddle member 20 is a pivot bolt 29, and loosely mounted for rotation on said bolt is a roller 30 for engagement with the adjacent flattened end of the seat bar 18 to reduce friction between the parts when the shifting mechanism is adjusted to vary the distance between the cultivator sections. Rigidly secured to each upper disk 25 is a strip of metal 31 having an eye formed therein and in which is pivotally mounted one end of a rod 32, the opposite end of the rod being pivotally connected at 33 with the adjacent end of a shift lever 34. The shift lever 34 is pivotally mounted at 35 on a plate 36 rigidly secured to the seat bar 18, and formed in the opposite ends of said plate 36 are a series of openings 37 adapted to register with corresponding openings 38 formed in the shift lever 34 to permit the insertion of a locking pin for the purpose of holding said shift lever in the desired position of adjustment. It will thus be seen that by moving the shift lever 34 on its pivotal axis 35, lateral pressure will be exerted on the rods 32 and, through the medium of the disks 24 and 25, move the adjacent longitudinal bar laterally, and as this bar is rigidly secured to the cultivator section, said section will be moved laterally with respect to the companion section so as to vary the space or distance between said sections. As the cultivator sections are adjusted laterally, the flattened ends 19 of the seat bar 18 will ride over the rollers 30 without friction and without affecting the position of the operator's seat 21 which will always be centered between the cultivator sections irrespective of the lateral adjustment of said sections. Inasmuch as the flat disks 24 and 25 are secured to the longitudinal bars 10 and the saddle members 20 are pivotally connected with the frame of the upper disks 25, either cultivator section may be tilted laterally on the pivot bolt 29 to conform to a hillside or other inclined surface without affecting the other section. Furthermore, the flat disks 24 and 25 form, in effect, fifth wheels to facilitate turning of the machine when it reaches the end of a row. It will thus be seen that the shifting mechanism is so constructed as to permit lateral adjustment of the cultivator sections to accommodate the width of the rows of plants and that either cultivator section may be tilted laterally with respect to the other or said sections tilted simultaneously in opposite directions to conform to the inclination of the ground over which the machine is traveling and that the flat disks of the shifting mechanism permit easy turning of the machine without binding or wedging action between the parts. Attached to the bottom of each runner 12 is an extra reinforcing strip 39 which can be removed and renewed when said strip wears out.

The cultivator plows or shoes 7 are preferably arranged in pairs and disposed between each pair of cultivator plows are spaced fenders 40 united by a connecting yoke 41, the opposite ends of which are rigidly secured to the face ends of the fenders, as shown. The purpose of the fenders 40 is to keep the soil that is plowed up from rolling back and covering the small plants, and these fenders are provided with braces 42 preferably connected with adjacent portions of the cultivator sections so as to maintain said fenders in spaced parallel relation at all times. Disposed at the rear of the cultivator sections are a series of supplemental frames or hangers 43 provided with eyes 44 through which the upper ends of the adjacent rods 8 extend. Each supplemental frame 43 is provided with a forward extension 45 terminating in a loop 46 adapted to receive a rock bar or shaft 47 and to which it is secured by a bolt 47'. A rock bar 47 is provided for each pair of cultivator shoes and the inner end of each rock bar is formed with a crank 48 to which is pivotally connected at 49 one end of an operating rod 50, the opposite end of which is connected to a hand lever 51 mounted on the forward portion of the adjacent cultivator section. The hand lever is pivotally mounted at 52 on the portion 53 of the bar 10, and secured to said bar 10 is a rack 54 which coacts with a catch on the hand lever 51 so that by swinging the hand lever on its pivot 52 the plows may be adjusted vertically and held in elevated position when the machine is making a turn.

Secured to the runners are spaced uprights 56 having openings 57 in their upper ends and in which are rotatably mounted relatively short pipe sections 58 which are fixed to the rock bar 47 by cotter pins 58' and form bearings for said rock bar. Arranged in advance of the uprights 56 is a vertical yoke 59 which serves to space the rear ends of the runners, and connected with said yoke is an inclined reinforcing brace 60, there being a horizontal bar 61 forming a rigid connection between the yoke 59 and the adjacent upright 56, as best shown in Figure 3 of the drawings. The rock bar 47 between the pipe sections 58 is formed with a shallow annular groove 62 in which is loosely mounted a hook 63 having one end of a chain 64 secured thereto and its other end secured at 65 to the yoke 41 of the fenders so as to permit vertical adjustment of the fenders and allow them to be set in a given position with reference to the distance above the soil and in which position they will remain even though the plows or shoes are lowered further into the ground. Connected with the central portion of the yoke 41 is a second chain 66, the upper end of which is fastened to an adjustable brace 67 connecting the hangers 43 and which chain serves to elevate the fenders 40 and prevent the same from being bent or broken when the implement is making a turn. The brace 67 is preferably formed in two sections, the inner overlapping ends of which are provided with registering openings 68 adapted to receive a bolt or similar fastening device so as to permit the plows to be adjusted laterally with respect to each other.

Each cultivator gang or section is provided with a plurality of rearwardly inclined cutting knives 69 for removing weeds and the like, and these knives are preferably mounted on the inner faces of each set of runners, as best shown in Figure 1 of the drawings. The inner or attached ends of the knives 69 extend through longitudinally tapered slots 70 and the inner ends of the knives are bent upwardly to form attaching flanges 71 which bear against a reinforcing plate 72 arranged on the inner face of the adjacent runner, as best shown in Figure 6 of the drawings. The runners and plate 72 are formed with slots 73 to permit adjustment of the knives, and fitted in said slots are securing bolts 74 which engage the flanges 71 and serve to hold the knives rigidly in adjusted position on the machine. Owing to the arrangement of the slots 70 and 73, the angle or inclination of the knives 61 may be varied at will and by removing the securing bolts 74 said knives may be readily detached from the machine when desired to facilitate sharpening the same.

In operation the machine is attached to a tractor and the cultivator sections adjusted laterally to agree with the rows of plants to be cultivated by operating the equalizing bar 34 in the manner before stated. As the machine is drawn over the ground, the plows at the rear of the sections will cultivate the growing plants, as will be readily understood. In order to adjust the plows vertically, it is merely necessary to press forwardly on the hand lever 51 which causes the rod 50 to rock the bar 47 and through the medium of the hangers 43 elevate said plows to the desired position and in which position they will be held by the catch on the hand lever engaging the rack bar 54. When the machine reaches the end of a row, the plows are elevated together with the fenders 40 and as the machine makes a turn the disks 24 and 25 will act as fifth wheels and facilitate turning movement of the machine. There will, of course, be sufficient clearance between the seat bar 18 and the frame structure to permit the cultivator sections to pass freely under the seat bar when making a turn. Should one of the cultivator sections be operating on a hillside, the pivot bolt 29 between the saddle member 20 and the frame 26 will allow said cultivator section to conform to the inclination of the ground while the other cultivator section will remain level. Should both cultivator sections be operating on inclined surfaces both of the cultivator sections can tilt laterally without interfering with the operation of the machine as the seat board 18 always remains in a horizontal position and is free to slide longitudinally within the saddle members 20, as will be readily understood.

It will be noted that the rear or free ends of the cutting blades 69 overlap and that certain of said blades project within the space between the cultivator sections so that the knives will not only cut weeds in the path of travel of the cultivator sections but also between said sections.

It will, furthermore, be noted that, inasmuch as the attaching flanges 71 of the blades are secured to the inside of the runners and the heads of the securing bolts 74 are rounded, a smooth unobstructed surface is presented and danger of the soil banking up against the side of the head of the blade and runner on which the blade is bolted or trash collecting thereon or on the securing bolts is effectually prevented. This is an important feature of my invention as it obviates the necessity of constantly cleaning the parts and permits instant angular adjustment of the cutting blades when desired.

It will thus be seen that there is provided an agricultural implement which will cultivate four rows of plants simultaneously, lateral adjustment of the cultivator gangs or sections being effected to accommodate the rows of growing plants by operating shifting mechanism disposed between the cultivator sections and operatively connected with both sections.

It will, of course, be understood that the machines may be constructed with any desired number of cultivator sections and the length and width of said sections may be varied according to the work to be performed.

From the foregoing description, it is thought that the construction and operation of the machine will be readily understood by those skilled in the art and further description thereof is deemed unnecessary.

Having thus described the invention, what is claimed as new is:

1. An agricultural implement including coacting cultivator sections, a seat bar connecting said sections, relatively stationary and movable disks mounted on the cultivator sections, a saddle member pivotally mounted for lateral tilting movement on each stationary disk and slidably receiving the adjacent end of the seat bar, rollers carried by the saddle members and bearing against the lower surface of the seat bar, a perforated plate secured to the seat bar between the cultivator sections, a shifting lever pivotally mounted on said plate and provided with perforations adapted to register with the perforations in said plate, rods forming a connection between the stationary disks and the opposite ends of the shifting lever, and a locking pin adapted to enter registering perforations in the plate and shifting lever respectively for holding the shifting lever in a set position.

2. An agricultural implement including coacting cultivator sections, a seat bar connecting said sections, relatively stationary and movable disks mounted on the cultivator sections, substantially U-shaped frames secured to the stationary disks, saddle members pivotally connected with the U-shaped frames and slidably receiving the adjacent ends of the seat bar, pivot bolts connecting the saddle members with the U-shaped frames, rollers journaled on the pivot bolts and engaging the seat bar, a shifting lever pivotally mounted on said seat bar, rods forming a connection between the stationary disks and the opposite ends of the shifting lever for adjusting the cultivator sections laterally with respect to each other, and means for holding the shifting lever in different positions of adjustment.

3. An agricultural machine including coacting cultivator sections each including spaced pairs of runners, transverse bars connecting said runners, longitudinal bars connecting the transverse bars, a seat bar extending transversely of the longitudinal bars, a seat mounted on said bar between the cultivator sections, lower disks secured to the longitudinal bars of said sections, upper disks coacting with the lower disks, substantially U-shaped frames secured to the upper disks, saddle members pivotally connected with the U-shaped frames and adapted to slidably receive the adjacent ends of the seat bar, a plate secured to the seat bar and having its opposite ends provided with a series of openings, a shifting lever mounted on said plate, rods forming a connection between the upper disks and the opposite ends of the shifting lever for adjusting the sections laterally with respect to each other, and openings formed in the shifting lever and adapted to register with a selected opening in the plate to permit the insertion of a fastening device for holding the shifting lever in adjusted position.

4. An agricultural implement including coacting cultivator sections, a seat bar connecting said sections, relatively stationary and movable coacting disks mounted on said sections, a frame secured to each stationary disk, a saddle bar pivotally connected with each frame and adapted to slidably receive the adjacent ends of the seat bar, a shifting lever pivotally mounted on the seat bar between the cultivator sections, rods forming a pivotal connection between the opposite ends of the shifting lever and said stationary disks for adjusting the cultivator sections laterally with respect to each other, and means for holding the shifting lever in adjusted position.

5. An agricultural machine including coacting cultivator sections each formed of spaced pairs of runners, vertically movable plows carried by the rear ends of the sections, fenders extending between the plows, rock shafts mounted for turning movement on the rear ends of the cultivator sections and operatively connected with the plows, toothed racks, hand levers having pawls engaging the adjacent racks, rods forming a connection between each hand lever and the adjacent rock shaft for raising and lowering the plows, a seat bar connecting the cultivator sections, coacting disks mounted on each cultivator section, saddle bars pivotally connected with the upper disks and receiving the seat bar, and means mounted on said seat bar and operatively connected with certain of the disks for adjusting the cultivator sections laterally with respect to each other.

6. An agricultural machine including coacting cultivator sections each formed of spaced pairs of runners, plows arranged at the rear of each pair of runners, said runners being provided with longitudinally disposed slots and having openings formed in the runners above said slots, cutting knives extending laterally from the runners and having their inner ends extended through the adjacent slots and bent upwardly to form flanges, fastening devices extending through the openings and engaging said flanges, means for raising and lowering the plows, a seat bar slidably connected with each cultivator section, coacting disks mounted on said sections, a shifting lever mounted on the seat bar, and means forming a connection between the shifting lever and certain of the disks for adjusting the cultivator sections laterally with respect to each other.

7. An agricultural machine including coacting cultivator sections each provided with spaced pairs of runners, spaced uprights secured to the runners and provided with terminal openings, rock shafts disposed at the rear ends of the runners, cylindrical bearing members secured to the rock shafts and journaled in said openings, hangers connected with the rock shafts and provided with terminal eyes, vertically adjustable plows provided with upstanding rods fitting in the eyes of the hangers, a pair of fenders interposed between each set of plows, braces connecting each pair of fenders, chains forming a connection between the fender braces and said hangers, a hook swiveled on each rock shaft between the cylindrical bearing members, a chain forming a connection between each hook and one of the fender braces, means operatively connected with the rock shafts for tilting the hangers to raise and lower the plows, and means forming a connection between the cultivator sections for adjusting said sections laterally with respect to each other and permitting independent tilting movement of said sections.

8. An agricultural implement including coacting cultivator sections each comprising spaced pairs of runners, transverse bars connecting the pairs of runners of each section, braces secured to one of the runners of each pair and to the adjacent transverse bar, each brace being provided with a series of openings, a hitch device engaging said openings, vertically adjustable plows mounted on the rear ends of the cultivator sections, means operatively connected with the plows for raising and lowering the same, a seat bar extending transversely of said sections, a set of coacting disks mounted on each cultivator section, saddle bars pivotally connected with one of the disks of each set and slidably receiving the adjacent ends of the seat bar, a shifting lever pivotally mounted on said seat bar, and rods forming a connection between the opposite ends of the shifting lever and adjacent disks whereby when the shifting lever is tilted on its pivot the cultivator sections will be adjusted laterally with respect to each other.

SAMUEL W. COKER.